Aug. 14, 1951  P. M. PEPPER  2,564,227
CALCULATING DEVICE
Filed June 16, 1947   3 Sheets-Sheet 1

INVENTOR.
PAUL M. PEPPER
BY
Ottoch + Knoblock
ATTORNEYS

Aug. 14, 1951          P. M. PEPPER          2,564,227
                     CALCULATING DEVICE
Filed June 16, 1947                      3 Sheets-Sheet 2
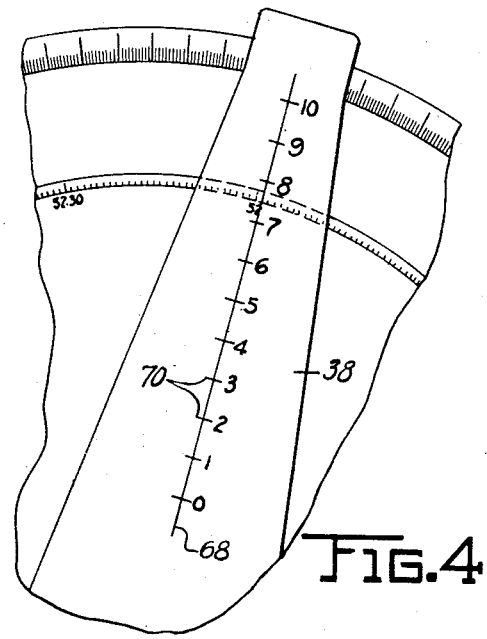
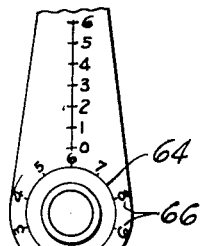
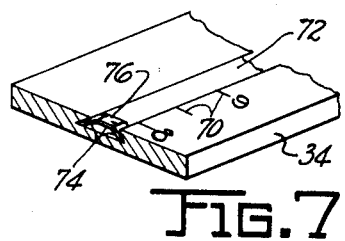
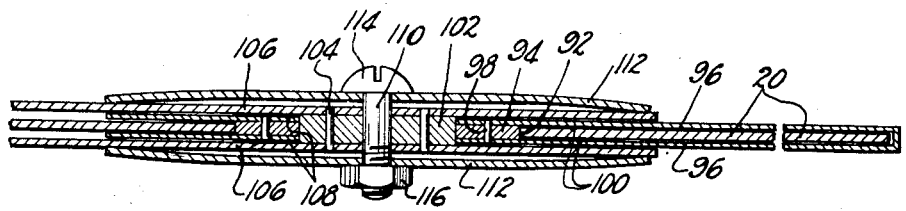
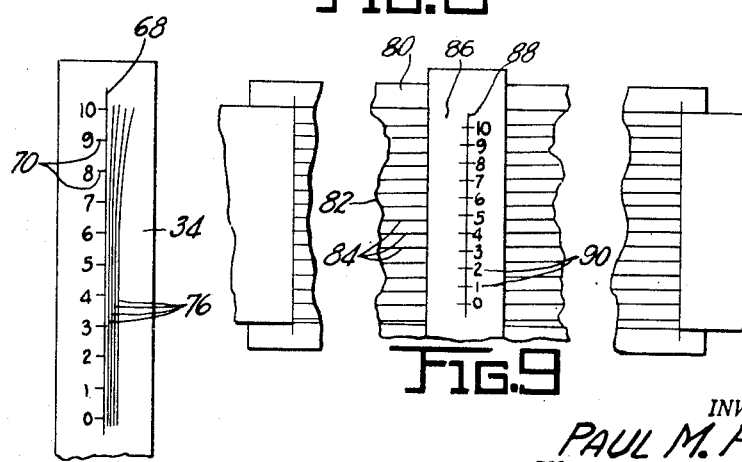
INVENTOR.
PAUL M. PEPPER
BY
Ottsch + Knoblock
ATTORNEYS Aug. 14, 1951     P. M. PEPPER     2,564,227
CALCULATING DEVICE Filed June 16, 1947     3 Sheets-Sheet 3

INVENTOR.
PAUL M. PEPPER
BY Oltsch & Knoblock
ATTORNEYS.

Patented Aug. 14, 1951

2,564,227

UNITED STATES PATENT OFFICE 2,564,227

CALCULATING DEVICE

Paul M. Pepper, South Bend, Ind.

Application June 16, 1947, Serial No. 754,934

22 Claims. (Cl. 235—67)

This invention relates to improvements in calculating devices, and more particularly to an all-purpose calculating device of the slide rule type.

The primary object of this invention is to provide a device of this character by means of which it is possible to make computations accurate to five decimal places.

A further object is to provide a device of this character comprising a disk having an annular equal division scale and a gang of helical logarithmic scales each having a plurality of convolutions, preferably ten in number, to which is centrally pivoted two transparent arms having radially extending graduated scales intersecting said disk scales, wherein the graduations are adapted to register with the helical scale in one position of the arms.

A further object is to provide a device of this character having a disk and arms pivoted thereto and extending radially thereof with guide means adapted to accurately position one of the arms at a starting position by feel and without requiring observation of the position of the arms.

A further object is to provide a device of this character having a disk provided with helical scales on both faces thereof, said scales being correlated whereby each thereof is a continuation of the other and the two constitute a logarithmic scale, wherein two sets of transparent arms are provided, one juxtaposed to each of the faces of the disk, and one arm of each set being correlated and held in register with a corresponding arm of the other set, and wherein a novel boltable clutch arrangement is provided.

A further object is to provide a device of this character including a disk having a helical scale to which a transparent arm is pivoted to intersect the convolutions of the scale, wherein said arm is provided with a pointer or marker and shiftable longitudinally of the arm to indicate any given position thereof, and which marker is so positioned that it clears and does not interfere with the pivoting of a second correlated pivoted arm.

Other objects of the invention are to provide rapid computation of an angular position by means of the provision of generalized locating indicia upon the hub of the device, the correlation of the zero position of the number scale with one end of the gang of helical logarithmic scales, the provision of vernier means on at least one of the arms, and the provision of a device which is sturdy, simple in construction and easy to operate and to read.

Other objects will be apparent from the following specification.

In the drawing:

Fig. 4 is an enlarged view illustrating the manner in which the device is used.

Fig. 6 is a detail view illustrating the hub marking.

Fig. 7 is a fragmentary perspective view of one of the scale arms illustrating the provision of a marker mounted adjustably thereon.

Fig. 8 is an enlarged fragmentary view similar to Fig. 5, illustrating a modified construction of the invention adaptable to devices wherein scales are applied to both faces of the disk and two correlated sets of arms are associated with the device.

Fig. 9 is a fragmentary face view illustrating the application of the invention to a slide rule of the elongated ruler type.

Fig. 10 is a view illustrating the provision of a vernier scale upon one of the arms of the device.

Figure 1:
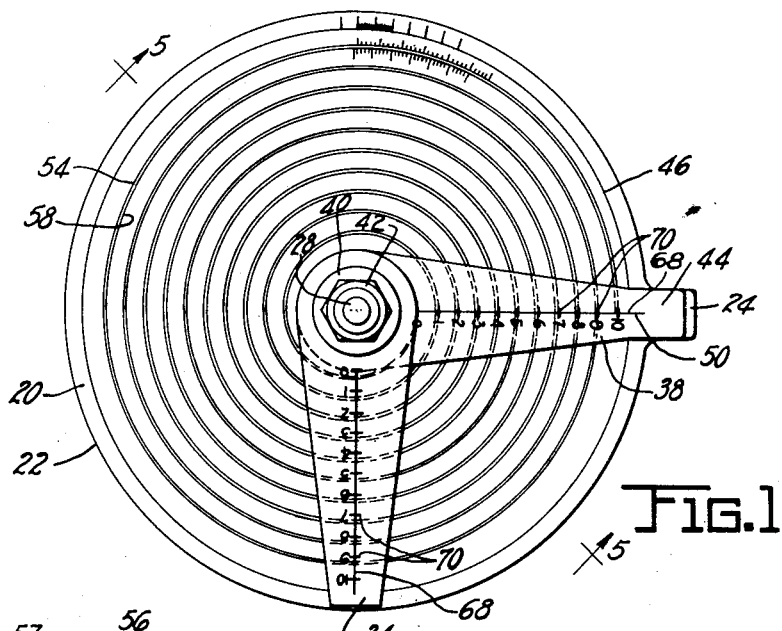
Fig. 1 is a face view of one embodiment of the invention.

Referring to the drawings which illustrate the preferred embodiment of the invention, the numeral 20 designates a disk which is preferably formed of rigid sheet material, such as metal, plastic or like material. The disk 20 has a circular outer edge 22 which is interrupted at one limited portion thereof by a tab portion 24 projecting radially outwardly therefrom. This tab portion has substantially parallel side edges which extend parallel to a radius of the disk centered thereat.

The disk 20 has a central aperture 26 through which extends the shank of a bolt 28 provided with a flat head 30 at one end. A disk or gasket 32 of friction material bears against one face of the disk 20, and one end of an elongated arm 38, which is formed of rigid transparent material, such as a plastic material, is provided with an opening through which the shank of the bolt 28 extends snugly to provide a pivot for said arm 38. A second disk 36 of friction material bears against the outer face of the arm 38, having a central opening fitting around the bolt 28, and a second elongated arm 34 formed of a transparent material, such as a plastic, has an opening fitting snugly around the bolt shank 28 and bearing against the friction disk 36. A concavo-convex resilient disk 40 fits around the shank of the bolt 28, and a nut 42 is threaded on the end of the bolt to apply pressure to the spring washer 40, whereby the parts, namely, the arms 34 and 38 and the disk 20 are drawn together in firm face engagement with the friction disks 32 and 36 interposed therebetween. The parts are so constructed and arranged, and the pressure applied is so adjusted, that the arms 34 and 38 may be swung to any desired radial position upon the disk and adjusted relative to each other as desired but will remain in any position at which they are set by the friction clamping action applied by the bolt, the nut and the spring washer 40. The arm 34 is of a length to terminate adjacent the peripheral edge 22 of the disk, as best illustrated in Fig. 1. The arm 38 is preferably greater in length and is adapted to overlie a portion of the tab 24, as illustrated in Fig. 1. It will be observed that the terminal portion 44 of the arm 38 is of the same width as the tab 24 so that the user may accurately position the arm 38 at a predetermined radius of the device by simply engaging the opposite edges of the arm extension 44 and the tab 24 to effect registration therebetween.

The disk 20 is provided with a marginal annular scale 46 which has a plurality of equispaced graduations. In the preferred form the scale 46 has one hundred equispaced primary numbered graduations 48, the zero graduation 50 of which is on the same radius as the radial center of the tab 24. A plurality of secondary graduations 52 divide equally, and preferably into ten equal spaces, the portion of the scale between adjacent primary graduations 48. A helical logarithmic scale, preferably having ten convolutions, occupies the major portion of the area of the disk with its outer end spaced inwardly from the number scale 46, and its inner end spaced outwardly of the spring washer 40, so that it is fully visible throughout its extent. The logarithmic scale is preferably of the character best shown in Fig. 2 and comprises a helical logarithmic scale 54 whose outer end is radially aligned with the zero position 50 of the number scale. The logarithmic number scale 54 is divided by suitably numbered primary scale divisions or graduations 56, and the spaces between these primary numbered graduations 56 are divided by the secondary logarithmic graduations 57 into an equal number of divisions which are preferably ten in number or some multiple or sub-multiple of ten. A second helical scale line 58 is juxtaposed to the scale 54 and preferably has the same number of convolutions although it may have more or fewer convolutions than scale 54. At one side of this scale may be provided graduations 60 suitably numbered which constitute a sine-cosine logarithmic scale. At the opposite side of the scale line 58 may be provided a second series of graduations 62 which will preferably comprise a tangent-cotangent logarithmic scale. The two sets of logarithmic scales 54, 58 are preferably arranged upon the disk, as illustrated generally at Fig. 1. The inner ends of the helical scale preferably terminate outwardly of the spring washer 40 a sufficient distance to permit the application thereto of a third graduated scale 64, best shown in Fig. 6, which is preferably divided into ten equally spaced numbered graduations 66 with respect to which the lines 68 on the arms 34 and 38 may be read at a glance to secure readings of tenths of a full turn of said arm about the disk instead of necessitating the reading thereof on the large scale 46.

Each of the arms 34 and 38 is provided with an elongated central longitudinal scale line 68 which is of a length and so positioned that it will intersect each of the scales 46, 54, 58 and 64 upon the disk. Each of the scale lines 68 upon the arms extend radially of the disk, and the line 68 upon the arm 38 is so positioned that when the outer end portion 44 of the arm 38 registers with the tab 24 upon the disk, the line 68 will intersect the scale 46 at its zero position 50, the scales 54 and 58 at their outer end portions, which will be the 1 of the scale 54, zero of the log cosine scale, 90° of the log sine scale, and 45° of the log tangent-cotangent scale, and the zero position of the scale 64. Each of the scale lines 68 is provided with ten numbered equispaced graduations 70 which are so positioned thereon that they register with the successive convolutions of the scale 54 when said arms are located at the zero setting, that is, at the position at which the arm 38 is shown in Fig. 1.

Figure 2:
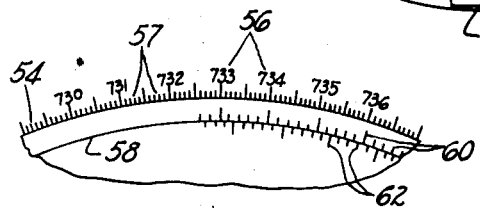
Fig. 2 is an enlarged view illustrating a portion of the helical logarithm scale.
Figure 3:
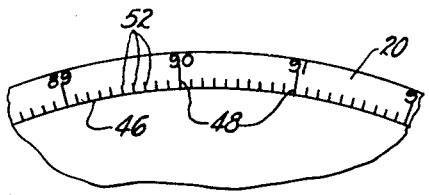
Fig. 3 is an enlarged fragmentary detail view illustrating the number scale.
Figure 5:
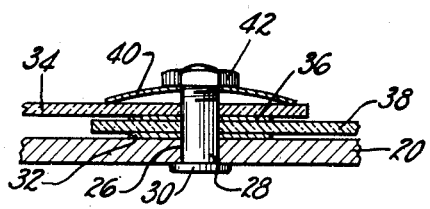
Fig. 5 is a fragmentary sectional view taken on line 5—5 of Fig. 1.

By the use of the device it is possible to make computations accurate to five significant figures of the following types: (a) logarithms of numbers and antilogarithms of numbers in the powers of ten, (b) logarithms of trigonometric functions and antilogarithms of trigonometric functions, and (c) computations of natural trigonometric functions. Thus it is possible to use the device as a mathematical operator to multiply or divide any two numbers or their reciprocals, multiply or divide a number either real or complex by a trigonometric function, and to multiply or divide any trigonometric function by another trigonometric function. As an illustration of the manner in which the device can be used for accuracy to five points, reference may be had to Fig. 4. We will assume here that the problem is to determine the logarithm of the cosine of 52 degrees. The arm 38 is set with its center longitudinal mark 68 coinciding with the 52 degree mark on the helical scale 58 as read from the cosine graduation 60, as seen in Fig. 2. It will be seen that the helical line will then occur between the divisions 7 and 8 of the scale 70 on the arm. This will show that the logarithm of the cosine of 52 degrees is .7 plus. Then by reading from the equal division number scale 46 it will be observed that the line 68 intersects the number scale 46 between the divisions numbered 89 and 90, as shown in Fig. 3. This gives the second and third places of the reading, namely, a reading of .789. The scale graduations 52 (Fig. 3), being divided into tenths, permits the reading of the next number from the scale, namely, the number 3. The fifth place number can be read by computing the nearest tenth portion or fraction between the graduations 52. While the drawing is not exactly accurate, it is possible with the actual device to determine accurately that the mantissa of the logarithm of the cosine 52 degrees is .78934.

In the use of the device for multiplication purposes the arm 38 is set at zero and the arm 34 is then set at the proper position with its center line 68 on one of the multiplication factors on the selected one of the helical logarithm number or logarithm trigonometric scales 54 and 58. The two arms so set at selected angularly displaced position are then rotated while that angular displacement is maintained until the first arm 38 is set with its center line on a second multiplication factor on the same or a second selected helical scale 54, 58 and any result is read from any selected helical scale with reference to the second arm, that is, the arm 34. This permits multiplication of two numbers, or of a number by any trigonometric function, or of any two trigonometric functions to make computations in spherical trigonometry and to make possible the solution of problems involving compound angles, as easily as computations involving ordinary numbers. The index of the answer, i. e., the turn of the helical scale 54—58 on which the answer is to be read, is the sum of the indicia of the various factors for multiplication. For example, to multiply three by four, the center line 68 of arm 38 is set on register as shown in Fig. 1. The center line 68 of arm 34 is set on "3" of the logarithm number scale 54, noting that the index of "3" as read from scale 70 where center line 68 of arm 34 intersects said scale is "4.8." The two arms are then rotated as a unit, i. e. maintaining their exact angular displacement relative to each other, until the center line 68 of arm 38 intersects the scale 54 at "4." The index of "4," as read from scale 70 on arm 38 at said intersection is "6.0." The sum, "10.8," of the indicia readings of the settings for "3" and "4" is the index of the products desired. If the scale has only ten turns, and the index sum is greater than ten, the index reading is reduced by ten (or a multiple thereof if the index sum of three or more numbers being multiplied exceeds 20), and the product is read from the scale 54 at the intersection of line 68 on arm 34 with the first turn of the scale, i. e., at index sum ".8." In the case of multiplication of two trigonometric functions, to solve a formula such as cos C=cos A cos B from spherical trigonometry, the settings are made on scale 58, the indicia 70 being read against scale 54, i. e., where the lines 68 intersect the base line of scale 54 contiguous to their intersections with scale 58. Otherwise, the procedure is similar to that for number multiplication. It will be apparent that the logarithm trigonometric scale permits direct reading of angles without need to convert angle readings to numbers and to reconvert numbers to angles.

Where division is to be performed, the arm 38 is first set on the denominator and the arm 34 is set on the numerator, and the index readings on scales 70 are noted; the two arms are rotated in unison, maintaining their relative angular displacement until the line 68 of arm 38 registers with "1" of the logarithm number scale; and the quotient is read at the intersection of line 68 of arm 34 with the turn of the scale 54 indicated by the difference of the index readings, i. e., the index of the denominator subtracted from the index of the numerator as noted in the initial setting. If necessary, the index reading of the numerator is increased by ten to make it exceed the index reading of the denominator before subtraction.

For the purpose of enabling the operator to have an indicator of the radial position of any setting directly upon the instrument, thereby enabling the operator to avoid the necessity for penciled notations in conjunction with the use of the device, I propose to use an indicator of the type best illustrated in Fig. 7. In this construction it will be observed that a dovetail groove 72 is formed in the arm which may be either the arm 34 or the arm 38 or both, said dovetail groove being positioned alongside and parallel to the scale graduations 70 upon said arm. An indicator member, preferably comprising a sheet metal stamping, a plastic molded part or any other item which may fit snugly but slidably in the dovetail groove 72, is provided therein. This member, here shown as a sheet metal member having diverging end portions 74 fitting in the dovetail groove and a transverse central portion 76 preferably flush with the face of the arm 34, may be provided with a suitable mark which can be set at register with any selected position of the graduated scale 70. The function and advantage of a slide of this character is believed to be apparent and enables the use of the device in any convenient manner.

In cases where it is desired to use a vernier scale, the same can be applied to one or both of the two arms 34, 38 in the manner illustrated in Fig. 10 where the vernier marking lines 76 extend alongside the marking line 68 on said arm, being juxtaposed to graduations 70 as shown and intersect the selected helical scale 54 or 58 which will include the necessary vernier graduations or markings properly correlated with the arm markings 76. Such a vernier scale is thus juxtaposed to the computing scale on the arm and is used in the same manner as vernier scales are used conventionally.

It is possible to apply the same arrangement and combination for computation purposes to a conventional slide rule, such as is shown in Fig. 9, having a longitudinally grooved body portion 80 and one or more slides 82 mounted in the groove or grooves of the body 80. In this case the graduated scales 84 upon the body 80 and the slide 82 are preferably inclined slightly with reference to the longitudinal dimension of the scale so that the end of one scale line at one end of the rule is at the same transverse position as the end of the next adjacent scale at the opposite end of the rule. Each individual scale line 84 corresponds to a selected portion of a full range of the scale. A cross-slide member 86 of conventional character formed of transparent material is provided with a central marking 88 with graduations 90 thereof spaced equally to the spacing of the rule scales 84 and adapted to accurately register therewith at one position of the device. It will be apparent that slide rule computations may be made from this device using the principle and in substantially the same manner as hereinabove described with reference to the circular or disk type. Specifically, one manner in which such a rule can be used is to adjust the slider 82 to zero position, then adjust the cross-slide 86 for registration of its hairline 88 with the first factor of the computation, noting the index as taken from scale 90 at the intersection of line 88 with the row or section 84 at which said factor occurs, then moving the slider 82 to the right or left for end registration thereof with the hairline 88 of the cross-slide 86, then moving the cross-slide 86 for registration of its hairline 88 with the second computation factor, noting from scale 90 the index of the row in which that factor occurs, and then moving the slide 82 back to zero position to read the result on the slide 82 at the hairline 88 of the cross-slide 86 on that row or section 84 of the rule whose index as taken from scale 90 is the sum of the indices of the rows 84 on which the two factors occurred. If the lines or scales 84 are not inclined, and if the number of lines 84 equals the number of graduations 90, then when right register of the slide is used, the product is found at the sum of the indices of the factors plus 1. This operation may be simplified in cases where the scales upon the slides are duplicated upon the body and the scale of the cross-slide is correspondingly set up to provide a scale cooperating with the scale upon the body and a second scale cooperating with the scale upon the slide. In that instance only three operations are necessary, namely, setting the cross-slide 86 at the first factor on the body 80 and noting the index of the first factor as read from that scale 90 of the cross-slide 86 which cooperates with the body 80, shifting the slide 82 to suitable register, either right or left, with the cross-slide hairline 88, and shifting the cross-slide 86 to the second factor read from the proper line 84 of the slide 82. The product may then be read from the body 80 at the intersection of hairline 88 with that row 84 whose index is equal to the sum of the indices of the rows of the two factors, or, if right-hand register has been used, at the row whose index is the sum of the indices of the rows of the two factors plus 1.

Figures 11, 12, 13:
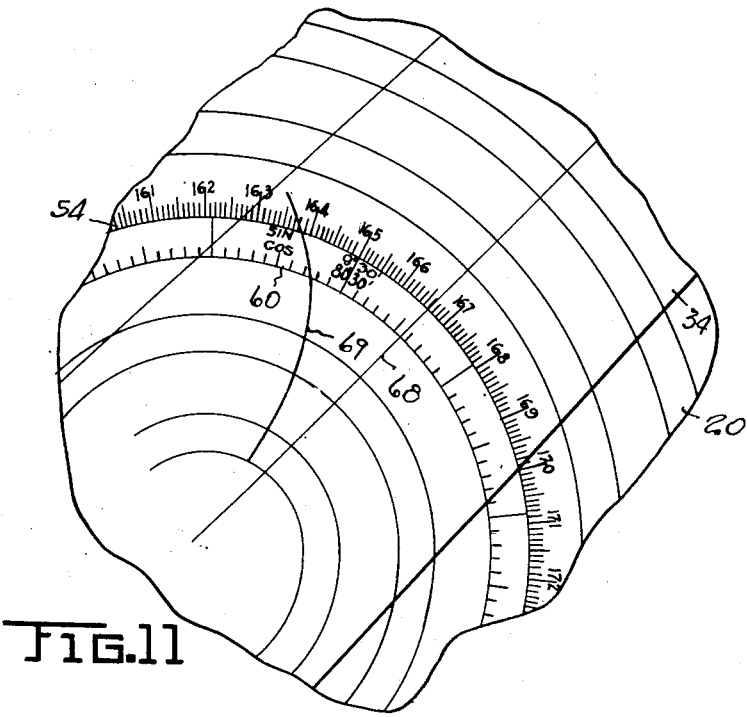
Fig. 11 is a fragmentary face view illustrating the construction for reading one condition from a scale setting made for a second and different condition.
Fig. 12 is a fragmentary view illustrating a modified embodiment of the invention utilizing a helical marginal number scale.
Fig. 13 is a fragmentary enlarged face view illustrating the manner in which vernier readings are made with a vernier scale of the character illustrated in Fig. 10.

In some instances it may be desired to divide the logarithmic scale into two parts in order to secure the desired degree of accuracy. For this purpose one portion of the helical scale 54, 58 may be placed upon one face of the disk and the balance thereof placed upon the other face of the disk. In such instances the scales will preferably each be arranged to have ten complete convolutions upon each face. In order to enable readings to be transferred from one scale face to the other, a construction of the type of Fig. 8 is used. In this form the disk 20 has a large opening 92 formed at the center thereof. Within this opening is positioned an annular member 94 of slightly greater thickness and having a snug but freely slidable fit in the opening 92. The annular member 94 is of slightly greater thickness than the disk 20 so that a pair of arms 96 secured to opposite faces of the annular member 94, as by means of pins 98, have clearance with the disk 20. A pair of annular friction members 100 are interposed between the arms 96 and the disk 20 at opposite faces thereof. Within the annular member 94 is positioned a hub member 102 of greater thickness than the combined thickness of the arms 96 and the annular member 94, and to this hub by means of the pins 104 are secured two radial arms 106. Friction disk members 108 are interposed between the arms 96 and 106. A bolt 110 passes through a central opening in the hub 102 and the arms 106 and through concavo-convex spring disks 112 positioned in engagement with opposite arms 106. The spring disks 112 are urged inwardly by the pressure exerted between the head 114 and a nut 116 upon the bolt 110. In this connection, assuming the scale at one face would be a helical scale covering a given limited range of the log sine-cosine and log tangent-cotangent for angles near zero degrees, it is possible to use a single set of graduations instead of separate graduations 60—62 as shown, by applying two longitudinal lines, instead of one line 68, as shown, which lines are arranged in proper relation to each other and to helical scale line to designate respectively the log sine or cosine and the log tangent or cotangent at any given setting of the arm. One example is shown in Fig. 11 which illustrates a construction which enables a limited extent of logarithm sine-cosine scale to be used in making computations which ordinarily require a logarithm tangent-cotangent scale. As there illustrated, if the tangent of 9°27.5′ is desired, the curved line 69 is set against the logarithm sine scale 60 at the angle desired, it being assumed that the logarithm tangent-cotangent scale 62 is omitted, and the point of intersection of the straight line 68 with the corresponding convolution of the logarithm number scale 54 designates the value of the natural tangent, i. e., .16661. In performing a computation involving the tangent of 9°27.5′, the setting made from the logarithm sine scale as above mentioned is used in conjunction with other setting, as described above for both multiplication and division, with the product or quotient being read from the intersection of the straight line 68 with the proper convolution of the logarithm number scale 54. If the product or quotient is the tangent or cotangent of an angle, the angle is read at the intersection of the curved line 69 with the logarithm sine scale 60.

It will be apparent that this construction permits the two arms 96 to be adjusted to any selected position at which they are held by the friction member 100, said arms always being in register by virtue of their interconnection by the pins 98. Similarly the two arms 106 are always held in register and may be adjusted to any radial position at which they are held by the friction members 108. Consequently, when a setting has been made of the arms with reference to the scale at one face of the device, that reading may be transferred to the other scale on the other face of the device by the opposite arm whose radial position will exactly coincide with the radial position of the first mentioned device.

While the equal division scale 46 has been described above as annular in form, it may be helical and composed of a plurality of convolutions, as shown at 47 in Fig. 12, wherein the divisions 53 are equiangularly displaced from the center of the disk 20. In this case a second group of graduations 71, corresponding to graduations 70 but correlated with the number scale only, will be placed on the arms 34—38 at the outer end of line 68 thereof. Thus, if the equal division scale 47 is helical and composed of three convolutions, the center line or hair line 68 of the arm 38, and 68 of the arm 34, may be provided with three intersecting graduations 71, of which at least one will register with a convolution of the helical scale 47 when the center lines of said arms register with the zero position of said scale 47. This set of graduations will obviously be spaced longitudinally from the set of graduations 70 shown and may be numbered to correspond with the number of convolutions of the scale 46 or in any other manner.

While the preferred embodiment of the invention has been illustrated and described herein, it will be understood that the construction of the device may be altered within the scope of the appended claims without departing from the spirit of the invention.

I claim:

1. A calculating device comprising a disk having an annular equal division scale and a helical logarithmic scale correlated at a reference point with said first scale and having a plurality of convolutions spaced equally on all radii, a pair of transparent arms pivoted at the center of said disk, friction means for holding said arms in selected angular relation, said arms each having a radial mark and a plurality of equi-spaced cross marks adapted to register with said convolutions when said radial mark registers with said reference point, said disk having a radial outward projection correlated with said reference point and of the same width as one of said arms, said arm being of a length to project beyond the periphery of said disk, said projection being positioned clear of the plane of rotation of said arms whereby said last named arm may overlie said projection.

2. A calculating device comprising a disk having a helical scale having a plurality of convolutions spaced on all radii and having graduations spaced differently on different convolutions according to a selected mathematical law, a pair of transparent arms pivoted at the center of said disk, friction means for holding said arms in selected angular relation, said arms each having a radial mark and a plurality of spaced cross marks adapted to register with said convolutions when said radial mark is in predetermined relation to said helical scale, one of said arms having longitudinal vernier markings extending alongside said radial marking and curved to vary the spacing from said radial marking according to the spacing of said convolutions and the graduations thereof.

3. A calculating device comprising a unit having a mathematical scale comprising a plurality of portions extending alongside each other in equally spaced relation, a shiftable transparent member carried by said unit, said member spanning said unit and having a graduated scale intersecting said first scale with its graduations registering with the portions of said first scale in one predetermined adjustment of said member, said scales being so positioned relative to each other and to the path of movement of said member that said graduations are displaced from register with said first scale in proportion to the spacing of said member from said predetermined adjustment on said unit, and guide means in the plane of and projecting from said unit and having an edge portion adapted to register with an edge portion of said member when the latter is set at said predetermined adjustment.

4. A calculating device comprising a unit having a gang of helically arranged sets of scale marks extending alongside each other in spaced, juxtaposed, interlayed relation and at least one helical line interlayed with said sets of scale marks, a shiftable transparent member carried by said unit, said member spanning said unit and having a graduated scale intersecting said scale gang and line with its graduations registering with said helical line in one predetermined adjustment of said member, said scales being so positioned relative to each other and to the path of movement of said member that said graduations are displaced from register with said helical line in proportion to the spacing of said member from said predetermined adjustment on said unit.

5. A calculating device comprising a rigid disk having a marginal helical graduated scale having a plurality of convolutions and an inner helical graduated scale having a plurality of convolutions and terminating at one end in radial alignment with the zero marking of the first helical scale, a pair of transparent radial arms each having a graduated longitudinal scale juxtaposed to and intersecting the first helical scale and a second graduated longitudinal scale juxtaposed to and intersecting said inner helical scale, with the zero graduations of the arm scales registering with said convolutions at zero setting.

6. A calculating device comprising a rigid disk having a circular graduated scale, a pair of transparent arms pivoted at the center of said disk and having a longitudinal scale intersecting the disk scale, and a guide portion projecting from said disk substantially in its plane and adapted for registration of an edge portion of an arm with an edge portion thereof for setting one arm in a selected radial position.

7. A calculating device comprising a rigid disk having a circular graduated scale, a pair of transparent arms pivoted at the center of said disk and having a longitudinal scale intersecting the disk scale, and a radial projection carried by and substantially in the plane of said disk, one of said arms being elongated and terminating in an end portion of the same width and adapted to overlie and register with said projection, said projection being positioned to effect a predetermined relation of said scales when said arm registers therewith.

8. A calculating device comprising a rigid disk having a circularly arranged measuring scale on each face thereof, said disk having a central aperture, an annular member rotatable in said aperture, a pair of transparent arms fixedly secured to said annular member, said arms being positioned in register at opposite sides of said disk, a central member mounted rotatably in said annular member, a second pair of transparent arms fixedly secured to said central member, said last named arms being positioned in register at opposite sides of said disk in planes spaced outwardly of the planes of said first arms, and means for holding said annular member, central member and said arms in operative assembled relation to said disk.

9. A calculating device comprising a rigid disk having a circularly arranged measuring scale on each face thereof, said disk having a central aperture, a rotatable unit including an annular hub mounted in said disk aperture, and a pair of registering arms secured to said hub and positioned at opposite sides of said disk, a second rotatable unit including a hub mounted within said annular hub and a pair of registering arms secured to said last named hub and positioned in planes outwardly displaced from the planes of the first arms, friction means interposed between said units and between said first mentioned unit and said disk, and clamping means for pressing said units and disk against said friction members.

10. A calculating device comprising a disk having a graduated helical scale and at least one transparent arm pivoted to said disk at the center of the disk and having two variably spaced lines extending longitudinally thereof and so related to the helical scale, the spacing of the divisions of said scale and to each other that one thereof may be used with reference to said helical scale to designate one type of condition, and the other thereof may be used with said helical scale to designate another type of condition.

11. A calculating device comprising a disk having a graduated logarithmic sine helical scale of limited range, and a pair of transparent arms pivoted to said disk at the center of the disk, at least one of said arms having two variably spaced lines extending longitudinally thereof and so related to the lead of the helical scale, to the graduations of said scale and to each other that one thereof may be used with reference to said helical scale to designate logarithmic sine and cosine functions, and the other thereof may be used with said helical scale to designate logarithmic tangent and cotangent functions.

12. A calculating device comprising a rigid disk having a circular graduated scale, a transparent arm pivoted at the center of said disk and having a mark intersecting said disk scale, and a portion projecting from said disk substantially in its plane and adapted for registration of an edge portion of said arm with an edge portion thereof for setting said arm in a selected radial position.

13. A calculating device comprising a rigid disk having a curved measuring scale on each face thereof, said disk having a central aperture, an annular member rotatable in said aperture, a pair of transparent arms fixedly secured to said annular member, said arms being positioned in predetermined relation to each other at opposite sides of said disk, a central member mounted rotatably in said annular member, a second pair of transparent arms fixedly secured to said central member, said last named arms being positioned in predetermined relation to each other at opposite sides of said disk in planes spaced outwardly of the planes of said first arms, and means for holding said annular member, central member, and said arms in operative assembled relation to said disk.

14. A calculating device comprising a disk having a helical scale and graduations spaced according to a selected mathematical law, at least one transparent arm pivoted at the center of said disk, said arm having a radial mark and having longitudinal vernier markings extending alongside said radial marking and curved to vary the spacing from said radial marking according to the spacing of different parts of said helical scale from the center of said disk and the spacing of scale graduations at different parts of said scale.

15. A calculating device comprising a substantially rigid sheet member having a plurality of spaced indicia and having an aperture therein, an annular hub rotatable in said aperture and of a thickness slightly greater than said member, a pair of members carried by opposite faces of said annular hub and overlying a portion of said sheet member surrounding said aperture, annular friction members interposed between said sheet member and each overlying member, an inner hub rotatable in said annular hub and of a thickness slightly greater than the spacing of the outer faces of said overlying members, a second pair of overlying members carried by opposite faces of said inner hub and overlying a portion of said first overlying member, annular friction members interposed between overlying members of adjacent pairs, and means for pressing said last named overlying members inwardly, at least one overlying member of each pair having indicia correlated with the indicia on said sheet member.

16. A calculating device comprising a substantially rigid sheet member having mathematical indicia on one face, a transparent member rotatable on said first member and having indicia correlated with said first indicia according to a predetermined mathematical law, and a portion projecting from said first member substantially in its plane and having a reference edge, an edge portion of said second member being adapted for registration with said reference edge for setting said members in selected rotative relation.

17. A calculating device comprising a substantially rigid sheet member having a scale thereon graduated according to a selected mathematical law, said scale having variably spaced graduations a transparent member having a mark thereon intersecting said scale, said transparent member being shiftable on said first member in a predetermined path to progressively change the point of said mark at which said mark intersects said scale, said transparent member having vernier markings extending alongside said first mark and spaced from said first mark according to that mathematical law which is determined by the positions of the graduations of said scale and to the shifting of the point of intersection of said first mark with said scale.

18. A calculating device comprising a substantially rigid sheet member having a scale thereon graduated according to a selected mathematical law, a transparent member having a mark thereon intersecting said scale, said transparent member being shiftable on said first member in a predetermined path to progressively change the point on said mark at which said mark intersects said scale, said transparent member having a second marking extending alongside said first mark and spaced from said first mark as determined by the difference between a second mathematical function and the function graduated according to said first mathematical law.

19. A calculating device comprising a substantially rigid sheet member having indicia on each face thereof, said sheet member having an aperture, an annular member rotatable in said aperture, a pair of transparent arms fixedly secured to said annular member, said arms being positioned in predetermined relation to each other at the opposite sides of said sheet member, a central member mounted rotatably on said annular member, a second pair of transparent arms fixedly secured to said central member, said last named arms being mounted in predetermined relation to each other at opposite sides of said sheet member and spaced outwardly of the positions of said first arms, and means for holding said annular member, central member and said arms in operative assembled relation to said sheet member.

20. A calculating device comprising a substantially rigid sheet member having indicia on each face thereof, the indicia on opposite faces being correlated to each other by a selected mathematical law, said sheet member having an aperture, an annular member rotatable in said aperture, a pair of transparent members fixedly secured to said annular member and overlying a portion of said sheet member, said transparent members being positioned in predetermined relation to each other at opposite sides of said sheet member, a central member mounted rotatably in said annular member, a second pair of transparent members fixedly secured to said central member and overlying at least a portion of said first transparent member, said last named transparent members being positioned in predetermined relation to each other at opposite sides of said sheet member and spaced outwardly of the positions of said first transparent members, and means for holding said annular member, central member and said transparent members in operative assembled relation to said sheet member.

21. A non-logarithmic calculating device comprising a substantially rigid sheet member having a scale thereon graduated according to a selected mathematical law, a transparent member having a mark thereon intersecting said scale, said transparent member being shiftable on said first member in a predetermined path to progressively change the point of said mark at which said mark intersects said scale, said transparent member having vernier markings extending alongside said first mark and spaced from said first mark according to that mathematical law which is determined by the positions of the graduations of said scale and to the shifting of the point of intersection of said first mark with said scale.

22. A calculating device comprising a substantially rigid sheet member, a linear mark on said member, said linear mark being laid out according to a selected non-logarithmic mathematical law, a scale along said linear mark, said scale graduated according to a second selected mathematical law, a transparent member having a measuring mark thereon intersecting said linear mark, said transparent member being shiftable on said first member in a predetermined path to progressively change the point of said measuring mark which intersects said linear mark, said transparent member having vernier markings extending alongside said measuring mark and spaced from said measuring mark according to that mathematical law which is determined by the positions of the graduations of said scale and to the shifting of the point of intersection of said measuring mark with said linear mark.

PAUL M. PEPPER.

REFERENCES CITED

The following references are of record in the file of this patent:

UNITED STATES PATENTS

| Number | Name | Date |
|---|---|---|
| 486,070 | Andrews | Nov. 15, 1892 |
| 1,207,439 | Picolet | Dec. 5, 1916 |
| 1,211,581 | Henoch | Jan. 9, 1917 |
| 1,404,019 | Gilson | Jan. 17, 1922 |
| 1,435,512 | Boggio | Nov. 14, 1922 |
| 1,436,282 | Nuckolls | Nov. 21, 1922 |
| 2,426,362 | MacDonald | Aug. 26, 1947 |

FOREIGN PATENTS

| Number | Country | Date |
|---|---|---|
| 863 | Great Britain | Mar. 1, 1881 |
| 28,603 | Great Britain | Dec. 11, 1912 |
| 180,695 | Great Britain | Aug. 27, 1923 |
| 533,945 | France | Dec. 23, 1921 |